177-71 SR
FIP-005 OF RF 11,274
BEST AVAILABLE COPY
E. N. BACHELDER & F. E. LOVEJOY.
WEIGHING OIL TANK.
No. 11,274. Reissued Oct. 4, 1892.
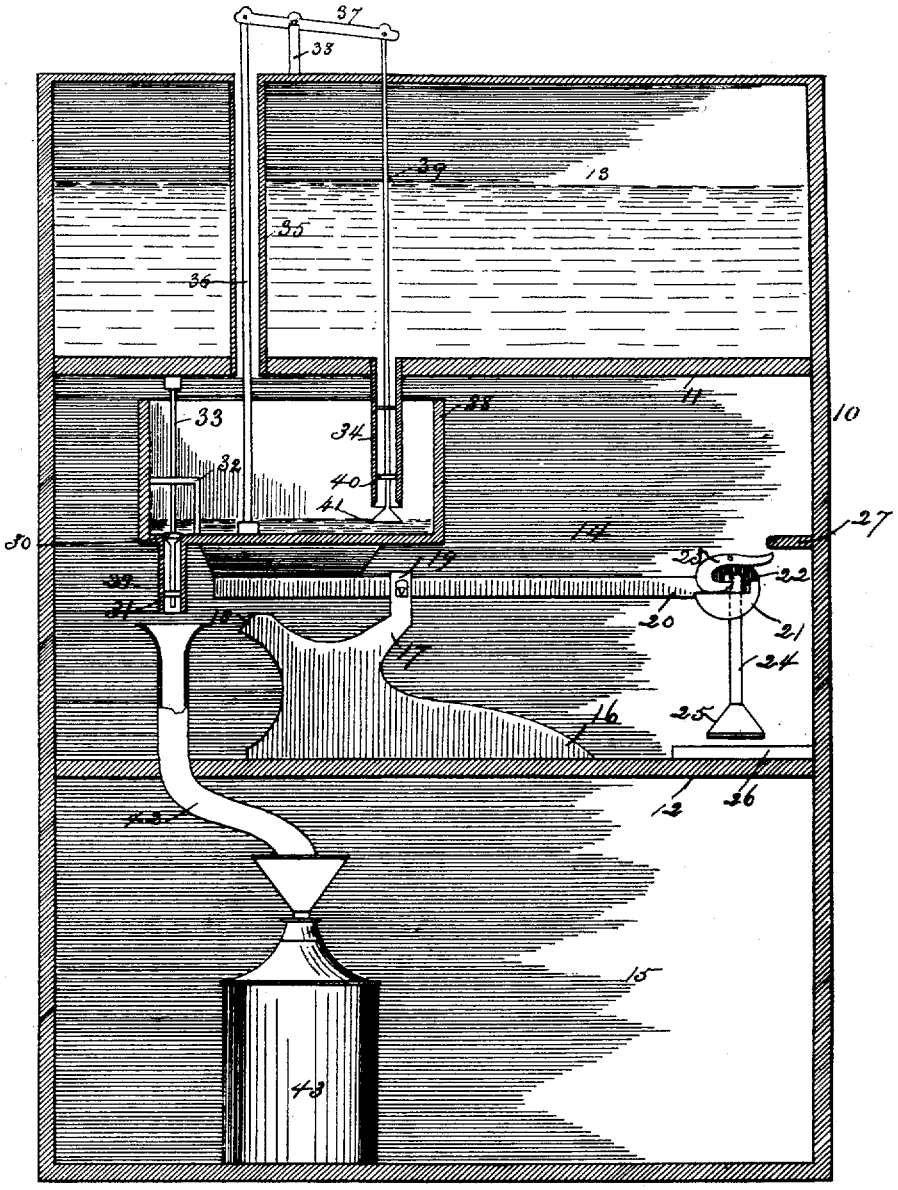
Witnesses:
M. B. Bullard,
[illegible]
Inventors:
Elmer N. Bachelder
Fred E. Lovejoy,
by [illegible]
Atty.

UNITED STATES PATENT OFFICE.

ELMER N. BACHELDER AND FRED E. LOVEJOY, OF PORTLAND, MAINE.

WEIGHING OIL-TANK.

SPECIFICATION forming part of Reissued Letters Patent No. 11,274, dated October 4, 1892.

Original No. 408,450, dated August 6, 1889. Application for reissue filed January 31, 1890. Serial No. 338,823.

*To all whom it may concern:*

Be it known that we, ELMER N. BACHELDER and FRED E. LOVEJOY, both of Portland, in the county of Cumberland and State of Maine, have invented a new and useful Improvement in Oil-Tanks, of which the following is a full, clear, and exact description.

Our invention relates to an improvement in oil-tanks, and has for its object to provide a means whereby oil may be delivered from one tank to another tank or vessel of any description in a convenient and expeditious manner and whereby the amount of oil to be delivered may be determined by weight.

The invention consists in the novel construction and combination of the several parts, as will be hereinafter more fully set forth, and pointed out in the claims.

Reference is to be had to the accompanying drawing, forming a part of this specification, in which the figure represents a central vertical section through a tank containing our improvements.

It is the custom of refiners in handling oil to deliver the same by weight, six and one-half pounds being the standard gallon. It is the prime object of this invention to provide a tank capable of accurately determining the weight of liquid delivered from one tank to another, whereby store-keepers or refiners may so weight the beam that any predetermined quantity of oil may be delivered to a receiving-vessel, and wherein when the said predetermined amount has been drawn from the storage-tank the outlet of said storage-tank will be instantly closed. To that end we have illustrated as the tank a receptacle or case 10, divided into three compartments by horizontal partitions 11 and 12, said compartments comprising an upper storage-tank 13, an intermediate weighing-compartment 14, and a lower compartment 15, in which the vessel is placed, adapted to receive a predetermined quantity of fluid.

In the weighing chamber or compartment 14 a pillar 16 is secured rigidly upon the upper face of the partition 12, which pillar is provided with two arms 17 and 18, each arm extending in an opposite direction from the top of the pillar, the arm 17 being provided with a bearing-block 19, in which a scale-beam 20 is fulcrumed in any suitable or approved manner, and the upper face of the pillar-arm 18 is so flattened as to form a cushion for one end of the scale-beam when the said end is depressed. The end of the scale-beam to which the weights are adapted to be attached is preferably made cylindrical, as shown at 21, and a recess 22 is cut in the outer or front face of the cylindrical extremity of the said scale-beam, which recess extends, preferably, from a point at or near the center to the top.

In the recess at 22 a hook-shaped latch 23 is pivoted, so weighted that the inner end will normally rest upon the base-wall of the recess 22, and in the said cylindrical extremity of the scale-beam a vertical aperture is made, extending upward from the bottom to an intersection with the recess 22.

The vertical aperture in the extremity of the scale-beam is adapted for the reception of the perpendicular rod of a weight-carrier 24 of any approved construction, which rod at the upper end is provided with a recess to receive the lower end of the hook 23, as illustrated in the drawing. The hook 23 retains the weight-carrier in connection with the beam.

In the drawing a weight 25 is represented as supported by the carrier, which weight we will say represents six and one-half pounds, the standard weight of a gallon of kerosene-oil, as before stated. When the rod or weight carrier is released from the pivoted hook catch or latch 23, it drops downward upon the cushion 26, the distance of the drop being so determined that the upper end of the rod of the weight-carrier will not leave the aperture in the beam. This tripping of the hook-like latch 23 is effected by the outer end of the said latch being brought in contact with a pin or stud 27, projected horizontally from the inner wall of the casing 10 within the weighing compartment or chamber 14.

Upon the short arm of the scale-beam a tank 28 is supported, having an open top, and in the end of the tank farthest removed from the scale-beam an aperture is produced in the body surrounded by a downwardly-extending tube 29. The aperture in the bottom of the tank just referred to is normally closed by a disk-valve 30, having a stem vertically projected from both its upper and lower faces, the lower stem being guided in a suitable bracket 31, secured transversely within the tube 29. The upper stem passes upward into the weighing-tank 28 and through a yoke 32, rigidly attached to the bottom and one side of said tank, and the upper end of the upper valve-stem is pivotally attached to the rod 33, which rod 33 is hinged to the under face of the upper transverse partition 11. When a weight has been placed upon the weight-carrier and the said carrier attached to the scale-beam, the weighing-tank is carried upward and the valve 30 completely closes the outlet-aperture in the bottom.

Communication is established between the storage tank or reservoir 13 and the weighing-tank 14 through the medium of a pipe 34, extending vertically downward from the partition 11 within the said weighing-tank to within a short distance of the bottom, the lower end of which pipe is preferably made flaring, as illustrated, and a pipe 35 is made to pass through the storage tank or reservoir and likewise through the upper partition 11 to the top of the casing.

A pitman 36 is hinged to the bottom of the weighing-tank and carried upward through the pipe 35 beyond the top of the casing, at which point it is pivoted to one end of a lever 37, fulcrumed upon a standard 38, secured to the top of the casing, and to the opposite end of the said lever 37 a jointed valve-stem 39 is pivoted, which valve-stem passes down through a suitable aperture in the top of the casing and through the storage tank or reservoir into the outlet-pipe of said reservoir, being guided therein by suitable brackets 40. The lower end of the valve-stem 39 is provided with an essentially-conical valve 41, capable of effectually sealing or closing the lower end of the storage-tank outlet 34. This valve automatically closes the said pipe 34 when the short arm of the scale-beam has been carried downward to a seat upon the arm 18.

A delivery-tube 42 is supported in the lower partition 12, extending upward in the weighing-compartment 14 beneath the outlet-tube 29 of the weighing-tank, the end of the delivery-tube within the said weighing chamber or compartment being flared to permit the passage of the outlet tube or pipe 29 of the weighing-tank therein, and the end of the tube 42, extending downward within the lower chamber or compartment 15 of the case, is so curved as to be readily adjusted over any form of receptacle 43 to be filled.

In operation, for instance, if a gallon of oil is to be drawn from the storage-tank and delivered into the receiving-vessel 43, a weight of six pounds and a half is placed upon the weight-carrier and the said carrier connected with the hook-latch 23 in the manner shown. As soon as the weight is felt by the scale-beam the short arm of the beam is carried upward, whereupon the pitman 36 is also forced up, and the lever 37 so manipulated that the valve 41 is forced downward beyond the end of the storage-tank outlet-tube 34, permitting the fluid in the reservoir to flow freely into the weighing-tank. At the same time that the tube 34 is opened the weighing-tank as it is carried upward contacts with the valve 30, and the outlet-opening of the said tank in the bottom is closed by the said valve, as illustrated. As soon as a sufficient quantity of oil—what is known as a "gallon," for instance—has flowed into the weighing-tank 28, the weighing-beam 20 is balanced, whereupon at the very moment this balancing occurs the outer end of the latch 23 is brought in contact with the lug 27, which action causes the outer or free end of the latch to be carried downward, disengaging the inner end from the weight-carrier, suffering the same, together with the weight, to fall downward upon the cushion 26. As the weighing-beam is released from the weight the short end of the scale-beam drops down to a contact with a pillar-arm 18, thereby drawing downward the weighing-tank, which action causes the valve 41 to close the end of the tube 34, and the bottom of the weighing-tank passes downward below the valve 30, thus permitting the oil to flow through the outlet-opening in the tube 29, and from thence into the delivery-tube 42 and to the receptacle to be filled. The action of the device is so quick that as soon as the proper amount of fluid has been received from the reservoir into the weighing-tank the valve 41 closes the supply-tube 34, and the tank, following downward with the weighing-beam, automatically opens the outlet nominally closed by the valve 30.

We desire it to be distinctly understood that while specific construction has been shown and described we do not confine ourselves thereto, as other equivalent construction may be employed without departing from the spirit of the invention.

Having thus described our invention, we claim as new and desire to secure by Letters Patent—

1. The combination, with a reservoir, of a scale-beam fulcrumed below the reservoir, a weighing-tank supported upon one arm of the scale-beam, a latch pivoted upon the extremity of the other arm of the scale-beam, a weight-carrier engaging with the said latch, means for tripping the latch, and a connection between the reservoir and the weighing-tank, substantially as shown and described.

2. The combination, with a reservoir and a scale-beam fulcrumed below the said reservoir, a latch pivoted upon the outer extremity of the longer arm of the said beam, and a weight-carrier supported by said latch, of a tank attached to the other arm of the scale-beam, provided with a valve-opening in its bottom and a valve connection between the reservoir and the weighing-tank, and means, substantially as shown and described, for tripping the pivoted latch, as and for the purpose specified.

BEST AVAILABLE COPY

3. The combination, with a reservoir, a scale-beam fulcrumed below the same, having its longer arm provided at the extremity with an essentially-hook-shaped pivoted latch, and a weight-carrier notched to receive one end of the said latch, of a tank supported upon the short arm of the weighing-beam, provided with an outlet-aperture in its bottom, a valve adapted to close the said outlet-aperture, having a jointed stem hinged to the lower surface of the reservoir, a trip post or stud held horizontally above the latch of the scale-beam, an outlet-tube extending from the reservoir into the weighing-tank, a valve adapted to close the lower end of the said outlet-tube, and a connection, substantially as shown and described, between the weighing-tank and the said valve of the outlet-tube, all combined for operation as and for the purpose specified.

4. The combination, with a reservoir, a scale-beam fulcrumed beneath the same, having an essentially-hook-shaped latch pivoted to the outer extremity of its longest arm, a weight-carrier provided with a notch in its vertical rod, capable of engagement with the inner end of the latch, and a trip post or stud horizontally supported above the outer end of the said latch, of a tank supported upon the shorter arm of the scale-beam, provided with an outlet-aperture in its bottom, a valve adapted to close said outlet-aperture, provided with a jointed stem hinged to the under surface of the reservoir, an outlet-tube projected from the reservoir and extending downward within the tank, a valve capable of closing the lower end of said outlet-tube, a lever fulcrumed upon the top of the reservoir, a stem connecting one end of the lever and the valve of the reservoir-outlet tube, and a pitman pivoted to the other end of the lever and hinged to the bottom of the weighing-tank, all combined for operation substantially as shown and described.

5. The combination of a scale-beam, a weighing-tank secured thereto, a weight-carrier adapted to depend from said scale-beam, and a tripping device for detaching said weight-carrier from said scale-beam when the latter begins to rise, substantially as described.

6. The combination, with a reservoir, of a scale-beam fulcrumed below the reservoir, a weighing-tank supported upon one arm of the scale-beam, a weight-carrier adapted to depend from the other arm of the scale-beam, a latch for forming a connection between the weight-carrier and the scale-beam, and means for tripping said latch, and a connection between the reservoir and the weighing-tank, substantially as described.

ELMER N. BACHELDER.
FRED E. LOVEJOY.

Witnesses:
S. W. BATES,
C. T. GIDDINGS.